(12) United States Patent
Myrstad et al.

(10) Patent No.: US 11,485,689 B2
(45) Date of Patent: Nov. 1, 2022

(54) CALCIUM NITRATE AND POTASSIUM NITRATE FERTILISER PARTICLES

(71) Applicant: YARA INTERNATIONAL ASA, Oslo (NO)

(72) Inventors: Amund Myrstad, Skien (NO); Petr Chladek, Porsgrunn (NO); Torstein Obrestad, Ulefoss (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 16/476,942

(22) PCT Filed: Jan. 15, 2018

(86) PCT No.: PCT/EP2018/050815
§ 371 (c)(1),
(2) Date: Jul. 10, 2019

(87) PCT Pub. No.: WO2018/130677
PCT Pub. Date: Jul. 19, 2018

(65) Prior Publication Data
US 2019/0389783 A1 Dec. 26, 2019

(30) Foreign Application Priority Data
Jan. 16, 2017 (EP) .................................... 17151570

(51) Int. Cl.
*C05C 5/02* (2006.01)
*C05C 5/04* (2006.01)
*C05G 5/30* (2020.01)

(52) U.S. Cl.
CPC .................. *C05C 5/02* (2013.01); *C05C 5/04* (2013.01); *C05G 5/30* (2020.02)

(58) Field of Classification Search
CPC .... C05C 5/02; C05C 5/04; C05G 5/30; C05D 1/02; C05D 9/18; C01F 11/36; C01D 9/00
See application file for complete search history.

(56) References Cited

U.S. PATENT DOCUMENTS

| | | | |
|---|---|---|---|
| 1,916,617 A * | 7/1933 | Ernst | C05C 5/00 71/29 |
| 4,240,818 A | 12/1980 | Sokolov et al. | |
| 5,244,592 A | 9/1993 | Michel | |
| 5,743,934 A * | 4/1998 | Wommack | C05D 3/02 71/28 |
| 5,938,813 A | 8/1999 | Araya et al. | |
| 6,176,892 B1 | 1/2001 | Obrestad et al. | |
| 2006/0013755 A1 * | 1/2006 | Isaksen | C01B 21/48 423/395 |
| 2014/0223906 A1 | 8/2014 | Gee et al. | |

FOREIGN PATENT DOCUMENTS

| | | |
|---|---|---|
| CA | 2 497 633 | 8/2006 |
| CL | 43118 | 6/1997 |
| CL | 44400 | 11/1998 |
| CL | 43453 | 12/1999 |
| CL | 44793 | 9/2004 |
| CN | 1697780 | 11/2005 |
| CN | 106 281 254 | 1/2017 |
| FR | 1320745 | 3/1963 |
| WO | 96/00199 | 1/1996 |
| WO | 97/15536 | 5/1997 |
| WO | 00/02831 | 1/2000 |
| WO | 2004/039722 | 5/2004 |
| WO | 2014/123537 | 8/2014 |

OTHER PUBLICATIONS

Argo, "Understanding Plant Nutrition: Fertilizers and Micronutrients", 2008, accessed from https://www.greenhousegrower.com/crops/ornamentals/understanding-plant-nutrition-fertilizers-and-macronutrients/ (Year: 2008).*
EcoGem, "Pellets, Prills, or Crushed: The Differences Explained", 2014, accessed from https://www.eco-gem.com/pellets-prills-crushed-differences-explained/ (Year: 2014).*
Walters, "Prilling", 2011, accessed from https://web.archive.org/web/20131005095950/http://thermopedia.com/content/1059/ (Year: 2011).*
Desai, Chaudhari, P., Bhavsar, D., & Chavan, R. (2013). Melt granulation: An alternative to traditional granulation techniques. Indian Drugs, 50(03), 03. (Year: 2013).*
Grant, Bonnie L. "Calcium Nitrate Fertilizer—What Does Calcium Nitrate Do For Plants" Gardening Know How <https://www.gardeningknowhow.com/garden-how-to/soil-fertilizers/calcium-nitrate-fertilizer.htm> Mar. 19, 2018 (Year: 2018).*
International Search Report dated Apr. 11, 2018 in International PCT Application No. PCT/EP2018/050815.
Written Opinion of the International Searching Authority dated Apr. 11, 2018 in International PCT Application No. PCT/EP2018/050815.

(Continued)

Primary Examiner — Jennifer A Smith
(74) Attorney, Agent, or Firm — Wenderoth, Lind & Ponack, L.L.P.

(57) ABSTRACT

The present disclosure concerns fertilizer particles comprising calcium nitrate and potassium nitrate. It is found that fertilizer particles comprising 43 to 47% w/w calcium nitrate and 46 to 54% w/w potassium nitrate can be produced by melt granulation. Due to undercooling problems, such particles were not expected to be suitable for industrial production by melt granulation. However, the present disclosure provides a composition which forms a low viscosity melt with short solidification time. This was successfully achieved by reducing the water content of a fertilizer melt comprising 43 to 47% w/w calcium nitrate and 46 to 54% w/w potassium nitrate to less than 3% w/w of the melt.

5 Claims, No Drawings

(56) References Cited

OTHER PUBLICATIONS

Database WPI, Week 201720, Thomson Scientific, London, GB; AN 2017-09817B, XP002771159, & CN 106 281 254 A (Univ Beijing Technology) Jan. 4, 2017, abstract.
International Preliminary Report on Patentability dated Mar. 1, 2019, in PCT/EP2018/050815.
Wang, Jiaming, "Production technology and development suggestions of nitro compound fertilizer", Hangzhou Chemical Industry, No. 1, pp. 5-8, with English Abstract.
Oommen et al., "Ammonium nitrate: a promising rocket propellant oxidizer", Journal of Hazardous Materials, 1999, A67, pp. 253-281.

\* cited by examiner

CALCIUM NITRATE AND POTASSIUM NITRATE FERTILISER PARTICLES

FIELD OF THE INVENTION

The present disclosure concerns fertilizer particles comprising nitrate, potassium and calcium.

BACKGROUND OF THE INVENTION

The primary fertilizer nutrients for plants are based on nitrogen (N), phosphorus (P) and potassium (K). They are mainly absorbed by plants in the form of ions, such as $NO_3^-$, $NH_4^+$, $HPO_4^{2-}$, $H_2PO_4^-$ and $K^+$. Accordingly, most inorganic fertilizers provide salts comprising some or all of the mentioned ions.

The primary nutrient grade of fertilizers is often declared as X-Y-Z wherein the X value corresponds to a theoretical percentage of elemental nitrogen by weight in the fertilizer. Y is the phosphorous content corresponding to an imaginary weight fraction of $P_2O_5$. Z is the potassium content corresponding to an imaginary weight fraction of $K_2O$. According to this system, pure ammonium nitrate should be declared as 35-0-0 and pure potash (KCl) should be declared as 0-0-60.

Fertilizers providing all the primary fertilizer nutrients in an available form for the plants, are often referred to as NPK fertilizers.

For some crops and agricultural situations, it is desired to provide a fertilizer without a phosphorous source. Examples of such fertilizers are NK fertilizers comprising a nitrogen source and a potassium source available for plants. NK fertilizers can be made by blending N fertilizers with K fertilizers. It is often desired to provide the fertilizers in the form of solid particles, but industrial particulation of NK fertilizers by melt granulation is far from trivial.

In particular, there is sometimes a need for NK fertilizers comprising calcium. Calcium is one of the secondary fertilizer nutrients for plants. Calcium is mainly absorbed by plants in the form of $Ca^{2+}$-ions and it contributes to the nutritional value directly and indirectly. Calcium is important for cell walls and can reduce bruising of fruits and vegetables. Furthermore, calcium deficiency in plants can lead to various growth disorders.

Many fertilizer melts comprising calcium nitrate tend to undercool, thus solidification of drops takes too long for a sensible industrial melt granulation process. Undercooling, also known as supercooling, is the ability of a liquid to reach a temperature below its freezing point without solidifying. Undercooling of a fertilizer melt may for example be severe problem for a large scale prilling process wherein liquid drops of a fertilizer melt should solidify during falling through a cooling medium.

As disclosed in FR1320745, a melt of calcium nitrate containing ammonium nitrate tends to form a supercooled mass.

In U.S. Pat. No. 6,176,892, the patentees conducted a thorough investigation of the various phases for calcium nitrate-water-potassium nitrate and disclosed an area where undercooling would not cause substantial problems. This area was defined as follows and undercooling was not reported to be avoided outside this area:

| | |
|---|---|
| $Ca(NO_3)_2$ | 40-14 weight % |
| $KNO_3$ | 55-85 weight % |
| Water | 0.5-6 weight |

In addition, the examples in U.S. Pat. No. 6,176,892 only cover the following concentration ranges of potassium nitrate and calcium nitrate, considering that Norsk Hydro calcium nitrate (NH—CN) contains only 79% of actual calcium nitrate:

Calcium nitrate: 19.75-31.6 w/w %
Potassium nitrate: 60-75 w/w %

CN106281254 discloses a binary mixed molten salt heat transfer and heat storage medium prepared from 47 weight percent of calcium nitrate tetrahydrate and 53 weight percent of potassium nitrate. The weight percentage of calcium nitrate as calcium nitrate tetrahydrate, hence an actual calcium nitrate amount of 25.5-28.7% weight (abstract).

WO0002831 disclosed that undercooling was avoided and particulation with conventional methods was possible when a calcium nitrate melt had a certain concentration range of potassium nitrate, water and calcium nitrate. This range was defined as follows:

1.5-5.5% by weight of K (as $KNOW_{3)}$
13-18% by weight of water
70-80% by weight of $Ca(NO_3)_2$ According to WO2004039722, all prilled or granulated calcium nitrate at the time contained 5 to 8% w/w ammonium nitrate in addition to 14 to 16 weight % water. It was stated that if the ammonium nitrate content was to be removed from the melt, the composition would undercool to such an extent that prilling/granulation would not be possible.

In the long history of calcium nitrate fertilizers, and in the almost 20 years since the publication of WO199715536, the applicant is not aware of any commercial fertilizers comprising 43 to 47% w/w calcium nitrate and 46 to 54% w/w potassium nitrate wherein the fertilizer is in the form of solid homogeneous particles. Nevertheless, there also exists an agricultural need for other NK fertilizer particles than those disclosed in WO199715536.

SUMMARY

The present disclosure concerns fertilizer particles comprising calcium nitrate and potassium nitrate. It is found that fertilizer particles comprising 40 to 50% w/w calcium nitrate and 45 to 55% w/w potassium nitrate can be produced by melt granulation. Due to undercooling problems, such particles were not expected to be suitable for industrial production by melt granulation. However, the present disclosure provides a composition which forms a low viscosity melt with short solidification time. This was successfully achieved by reducing the water content of a fertilizer melt comprising 40 to 50% w/w calcium nitrate and 45 to 55% w/w potassium nitrate to less than 3% w/w of the melt.

According to a first embodiment, the present disclosure concerns a fertilizer comprising 43 to 47% w/w calcium nitrate and 46 to 54% w/w potassium nitrate wherein the fertilizer is in the form of solid homogeneous particles.

In one particular aspect of the first embodiment, the fertilizer comprises about 45% w/w calcium nitrate and 49 to 53% w/w potassium nitrate.

In one particular aspect of the first embodiment, the fertilizer comprises about 45% w/w calcium nitrate ad 49 to 51% w/w potassium nitrate.

In one particular aspect of the first embodiment, the fertilizer comprises about 45% w/w calcium nitrate and about 53% w/w potassium nitrate.

In one particular aspect of the first embodiment, the fertilizer comprises about 45% w/w calcium nitrate and about 49% w/w potassium nitrate.

In one particular aspect of the first embodiment, the fertilizer consists of 43 to 47% w/w calcium nitrate and 46 to 54% w/w potassium nitrate and less than or equal to 3% w/w of water.

In one particular aspect of the first embodiment, the fertilizer comprises granules.

In one particular aspect of the first embodiment, the fertilizer comprises prills.

In one particular aspect of the first embodiment, the fertilizer comprises particles further comprising a coating.

According to a second embodiment, the present disclosure concerns an intermediate product, a fertilizer melt comprising 43 to 47% w/w calcium nitrate and 46 to 54% w/w potassium nitrate and 2 to 5% w/w ammonium nitrate and less than 3% w/w water.

In a third embodiment, the present disclosure concerns a method for producing solid fertilizer particles comprising the steps of
 a. formation of liquid drops from a homogeneous fertilizer melt comprising 43 to 47% w/w calcium nitrate and 46 to 54% w/w potassium nitrate
 b. and less than 3% w/w water
 c. cooling of the liquid drops to form solid particles
 d. coating of the solid particles.

In one particular aspect of the third embodiment, the temperature of the fertilizer melt is in the range of 153 to 225° C.

In one particular aspect of the third embodiment, the liquid drops are solidified by falling through a cooling fluid.

In one particular aspect of the third embodiment the amount of coating applied is in the range of 0.05 to 0.3% w/w relative to the weight of the particles.

In one particular aspect of the third embodiment, the fertilizer melt comprises about 45% w/w calcium nitrate and about 53% w/w potassium nitrate and the temperature of the fertilizer melt is in the range of 200 to 225° C.

In one particular aspect of the third embodiment, the fertilizer melt comprises about 45% w/w calcium nitrate and about 49% w/w potassium nitrate and the temperature of the fertilizer melt is in the range of 200 to 225° C.

DETAILED DESCRIPTION

The present disclosure concerns novel fertilizer particles comprising calcium nitrate and potassium nitrate which can be produced by melt granulation. Melt granulation is the most commonly used industrial process for production of fertilizer particles. It generally includes heating of an aqueous mixture comprising fertilizer salts to generate a fertilizer melt. As used herein, a fertilizer melt is a fluid comprising completely and/or partly dissolved fertilizer salts wherein the water content of the fertilizer melt is less than 20% w/w. Accordingly, the fertilizer melt may be solid at ambient temperature, but liquid at increased temperatures such as above 100° C. Due to the relatively high temperatures, most of the water in the melt may be evaporated from the fertilizer melt before a drop generation step. The drop generation step can involve spraying of the fertilizer melt through nozzles. The liquid drops can then be solidified by various well known methods. For example, prilling is one type of melt granulation process which can produce reasonably uniform spherical particles by solidifying the drops as they fall through a cooling fluid. Pan granulation is another example of a type of melt granulation process in which drops are solidified by agitation and layering.

Notably, melt granulation processes are not easily tested on a small scale, thus reliable large scale data are often unavailable. The present disclosure provides a fertilizer melt suitable for melt granulation. The composition can form a low viscosity melt with short solidification time.

Low viscosity melts allow drop generation through nozzles. The viscosity of fertilizer melts tend to correlate with the water content at constant temperature. At particularly low levels of water, it is expected that the viscosity is increased to such a degree such that the melt is no longer suitable for melt granulation. However, it has been found that reducing the water content of a fertilizer melt comprising 43 to 47% w/w calcium nitrate and 46 to 54% w/w potassium nitrate to less than 3% w/w of the melt, would still produce a melt suitable for melt granulation. Such fertilizer melt may be generated by mixing an aqueous solution comprising dissolved calcium nitrate with an aqueous solution comprising potassium nitrate followed by evaporation of water. As used herein, a fertilizer in the form of solid homogeneous particles is the product resulting from the melt granulation of such fertilizer melt.

Accordingly, a fertilizer in the form of solid homogeneous particles comprising 43 to 47% w/w calcium nitrate and 46 to 54% w/w potassium nitrate can be made by melt granulation. In particular, solid homogeneous particles comprising 43 to 47% w/w calcium nitrate and 48 to 53% w/w potassium nitrate can be made. In particular, solid homogeneous particles comprising 43 to 47% w/w calcium nitrate and 49 to 53% w/w potassium nitrate can be made. In particular, solid homogeneous particles comprising about 45% w/w calcium nitrate and 49 to 53% w/w potassium nitrate can be made. In particular, solid homogeneous particles comprising about 45% w/w calcium nitrate and 49 to 51% w/w potassium nitrate can be made. In particular, solid homogeneous particles comprising about 45% w/w calcium nitrate and about 49% w/w potassium nitrate can be made. In particular, solid homogeneous particles comprising about 45% w/w calcium nitrate and about 53% w/w potassium nitrate can be made. The water content of the fertilizer melts subject to granulation should be within the range 0 to 3% w/w before the granulation step. In particular, the water content of the fertilizer melts subject to granulation may be within the range 0.5 to 3% w/w. In particular, the water content of the fertilizer melts subject to granulation may be within the range 1 to 3% w/w. In particular, the water content of the fertilizer melts subject to granulation may be lower than 3% w/w. In particular, the water content of the fertilizer melts subject to granulation may be about 2% w/w. It is assumed that the residual moisture content of the particles produced from the melt will generally correspond to the water content of the fertilizer melt subject to granulation. However, because of continued water evaporation during the particulation, the residual moisture content of the particles may not be identical to water content of the fertilizer melt. As used herein, the water content of the particles may be residual moisture from the fertilizer melt and/or water absorbed from surroundings. In particular, solid homogeneous particles comprising 43 to 47% w/w calcium nitrate, 46 to 54% w/w potassium nitrate and 0.5 to 3% w/w water can be made. In particular, solid homogeneous particles comprising 43 to 47% w/w calcium nitrate, 46 to 54% w/w potassium nitrate and 1 to 2% w/w water can be made.

As used herein, calcium nitrate is the salt $Ca(NO_3)_2$ which may or may not be hydrated. Accordingly, calcium nitrate can be anhydrous $Ca(NO_3)_2$, $Ca(NO_3)_2 2H_2O$, $Ca(NO_3)_2 \cdot 3H_2O$ and $Ca(NO_3)_2 \cdot 4H_2O$. However, as used herein, when referring to X% w/w of calcium nitrate, we refer to the relative weight of calcium nitrate as if it was present in anhydrous form, irrespective of the actual degree of hydration. Thus, compositions comprising calcium nitrate will usually also comprise water as hydrates. Accordingly, solid homogeneous particles comprising for example 95% w/w of calcium nitrate could also comprise 5% w/w of water. Notably, the melting point of pure anhydrous calcium nitrate is 561° C., while the calcium nitrate tetrahydrate melting point is 42.7° C.

As used herein, potassium nitrate is the salt $KNO_3$. The melting point of potassium nitrate is 334° C. Without wishing to be bound by theory, it may be that solid potassium nitrate particles added to a fertilizer melt with a temperature in the range 100 to 200° C. would remain in solid state.

For melt granulation processes, it is beneficial to generate a composition with a melting point at a fairly low temperature, for example 100 to 200° C., but significantly higher than ambient temperature. Then, solidification of particles from the composition may be facilitated by cooling via ambient air. It is found that a fertilizer melt comprising 43 to 47% w/w calcium nitrate and 46 to 54% w/w potassium nitrate and less than 3% w/w water could be used to form solid homogeneous particles comprising 43 to 47% w/w calcium nitrate and 46 to 54% w/w potassium nitrate in a simulated prilling process as disclosed in Example 4.

A short solidification time is beneficial during industrial melt granulation processes, in particular in prilling, spherodization, drum granulation or pan granulation processes.

Undercooling of mixtures of calcium nitrate and potassium nitrate is well known to cause problems during melt granulation like prilling (see WO199715536). Due to undercooling problems, particles comprising 43 to 47% w/w calcium nitrate and 46 to 54% w/w potassium nitrate were not expected to be suitable for industrial production by melt granulation.

Due to the low melting point, pure calcium nitrate tetrahydrate particles are difficult to produce by conventional melt granulation techniques, but the presence of ammonium nitrate in the calcium nitrate melt is well known to improve solidification properties (see WO200002831). However, it has been found that ammonium nitrate is not a beneficial ingredient for the melts comprising calcium nitrate and potassium nitrate with respect to solidification time. Accordingly, solid homogeneous particles consisting of 43 to 47% w/w calcium nitrate and 46 to 54% w/w potassium nitrate and residual moisture can be made by, for example prilling, spherodization, drum granulation or pan granulation and there is no benefit to the granulation processes by adding any ammonium nitrate. In particular, solid homogeneous particles consisting of 43 to 47% w/w calcium nitrate and 48 to 54% w/w potassium nitrate and less than 2% w/w of water can be made. In particular, solid homogeneous particles consisting of 44 to 46% w/w calcium nitrate and 48 to 50% w/w potassium nitrate and less than 3% w/w of water can be made. Solid homogeneous particles consisting of 43 to 47% w/w calcium nitrate and 46 to 54% w/w potassium nitrate and residual moisture made by melt granulation may initially be amorphous and transparent. Without wishing to be bound by theory, the particles may turn opaque during storage due to crystallisation without significantly affecting the particle strength.

The solid particles made from fertilizer melts comprising 43 to 47% w/w calcium nitrate and 46 to 54 w/w potassium nitrate and less than 3% w/w of water may then be coated using conventional techniques known in the art (see for example WO9600199). Such particles have desirable physical properties such as low caking tendency, low surface area and high particle strength.

Homogeneous particles, as used herein, mean that the particles are essentially uniform with respect to their nutrient composition throughout the particles. Such particles can be produced by granulation of a homogenous melt comprising the nutrients. Homogeneous fertilizer particles are generally preferred over heterogeneous particles and heterogeneous blends because they allow a more uniform and reliable release of the nutrients.

The inorganic homogeneous fertilizer particles in the present disclosure can be produced by melt granulation. Notably, the viscosity of such melts is of high importance for an industrial process. The inorganic homogeneous NK fertilizer particles in the present disclosure can for example be produced by spherodization, prilling, pan granulation, drum granulation or by cooling belt technology. As used herein, a granule is the particle resulting from the particulation of an NK fertilizer melt by a melt granulation technology that is not prilling. As used herein, a prill is the particle resulting from the prilling of an NK fertilizer melt.

The inorganic homogeneous NK fertilizer particles according to the present disclosure may be applied to fields by spreading machines. For efficient distribution by conventional machines, an average diameter in the range of 1 to 10 mm can be suitable. It is particularly beneficial that more than 50% of the volume of particles have a diameter in the range of 2 to 5 mm.

The inorganic homogeneous NK fertilizer particles in the present disclosure can, if desired, be coated with conventional technologies to further improve their robustness or to provide specific nutrients. The reduced porosity of these inorganic homogeneous fertilizer particles comprising calcium nitrate and potassium nitrate is thus a further advantage with respect to efficient coating. For these particles, less coating material is needed for obtaining a continuous coating protecting the particle core. By coating of the inorganic homogeneous fertilizer particles according to the present disclosure, it is possible, if desired, to obtain heterogeneous particles. If coated, the core will remain homogeneous.

As used herein, % w/w means the weight percentage.

As used herein, "about X" means any measured or calculated value which would be rounded to X.

It is understood that the ingredients of fertilizer particles and fertilizer melts in this disclosure will constitute 100%. Accordingly, a fertilizer comprising 45% w/w calcium nitrate and 50% w/w potassium nitrate will contain 5% w/w other ingredients (e.g. residual moisture). Accordingly, a fertilizer comprising 44 to 46% w/w calcium nitrate, 50% w/w potassium nitrate and less than 3% w/w of residual moisture will contain up to 6% w/w of other ingredients. The fertilizers disclosed herein may accordingly in addition to calcium nitrate, potassium nitrate and residual moisture comprise 0 to 11% w/w other ingredients, 0 to 10% w/w other ingredients, 0 to 9% w/w other ingredients, 0 to 8% w/w other ingredients, 0 to 7% w/w other ingredients, 0 to 6% w/w other ingredients, 0 to 5% w/w other ingredients, 0 to 4% w/w other ingredients, 0 to 3% w/w other ingredients or 0 to 2% w/w other ingredients.

In one embodiment the other ingredients may comprise ammonium nitrate, such as 2 to 5 w/w % ammonium nitrate or 2 to 4 w/w % ammonium nitrate.

Methods for measuring the amount of potassium salts or calcium salts in a fertilizer particle are well known to a skilled person, for example as disclosed in "Testing Methods for Fertilizers" (2013) by the Japanese Incorporated Administrative Agency for Food and Agricultural Materials Inspection Center or "Methods of sampling and test for fertilizers" (1985) by Bhavan et al; Indian standard IS:6092 (Part 6).

The present invention is defined by the claims and not by the following examples:

EXAMPLES

Example 1

364 g of an aqueous solution comprising 182 g dissolved $Ca(NO_3)_2$ was combined with 436 g of an aqueous solution comprising 218 g dissolved $KNO_3$. The resulting mixture was heated to 220° C. and water was evaporated until the water content reached 2% w/w. This fertilizer melt was poured onto a solid steel block tempered to −5° C., where it solidified in 2.5-7 min, depending on the deposit thickness. The composition of the solidified melt was 45% w/w $Ca(NO_3)_2$, 53% w/w $KNO_3$ and 2% water. The melting point of a composition comprising 45% w/w $Ca(NO_3)_2$, 53% w/w $KNO_3$ and 2% water was found to be about 152° C.

Example 2

403 g of an aqueous solution comprising 50% w/w dissolved $KNO_3$ was mixed with 396 g of an aqueous solution comprising 50% w/w of a dissolved fertilizer, which, before dissolution contained 78% w/w $Ca(NO_3)_2$, 7% w/w $NH_4NO_3$, and 14% w/w water. The resulting solution was heated to 220° C. and water was evaporated until the water content reached 2% w/w. This so obtained fertilizer melt was poured onto a solid steel block tempered to −5° C., where it solidified in 6-10 min, depending on the deposit thickness. The solidification time is significantly longer than the composition in example 1. The composition of the solidified melt was 45% w/w $Ca(NO_3)_2$, 49% w/w $KNO_3$, 4% w/w $NH_4NO_3$ and 2% w/w water.

Example 3

202 g of an aqueous solution comprising 50% w/w dissolved $KNO_3$ was mixed with 233 g of an aqueous solution comprising 50% w/w of a dissolved fertilizer, which, before dissolution contained 78% w/w $Ca(NO_3)_2$, 7% w/w $NH_4NO_3$, and 14% w/w water. The resulting solution was heated to 220° C. and water was evaporated until the water content reached 2% w/w. This so obtained fertilizer melt was added drop-wise to a solid-steel circular block tempered to −5° C. The droplets solidified within 7 seconds and had outer diameter of 9 mm. The composition of the solidified droplets was: 45% w/w $Ca(NO_3)_2$, 49% w/w $KNO_3$, 4% w/w $NH_4NO_3$ and 2% w/w water.

Example 4

493 g of an aqueous solution comprising 50% w/w dissolved $KNO_3$ was mixed with 507 g of an aqueous solution comprising 50% w/w of dissolved fertilizer, which, before dissolution contained 78% w/w $Ca(NO_3)_2$, 7% w/w $NH_4NO_3$, and 14% w/w water. The resulting solution was heated to 220° C. and water was evaporated until the water content reached 2% w/w. This so obtained fertilizer melt was added drop-wise to a glass column (height 90 cm, inner diameter 10 cm) containing mineral oil at room temperature. Solid prills with outer diameter 4 mm were collected in the bottom and, after draining of the oil, retrieved. The composition of the solidified prills was: 45% w/w $Ca(NO_3)_2$, 49% w/w $KNO_3$, 4% w/w $NH_4NO_3$ and 2% w/w water. The hardness these prills remained high (10 kgf) after 1 week at room temperature and humidity varying from 30 to 55%. The surface of the prills was smooth, thus the amount of coating needed to protect the particles was lower than expected. When a coating as described in WO9600199 was applied (0.2% w/w coating composition relative to the particles) the caking index was below 100.

The invention claimed is:

1. A method for producing solid fertilizer particles comprising the steps:
   a. forming liquid drops from a homogeneous fertilizer melt comprising 43 to 47% w/w calcium nitrate and 46 to 54% w/w potassium nitrate and less than 3% w/w water;
   b. cooling the liquid drops to form solid particles; and
   c. coating the solid particles,
   wherein the amount of coating applied is in the range of 0.05 to 0.3% w/w relative to the weight of the particles.

2. The method according to claim 1, wherein the temperature of the fertilizer melt is in the range of 153 to 225° C.

3. The method according to claim 1, wherein the liquid drops are solidified by falling through a cooling fluid.

4. The method according to claim 1, wherein the fertilizer melt comprises about 45% w/w calcium nitrate and about 53% w/w potassium nitrate and wherein the temperature of the fertilizer melt is in the range of 200 to 225° C.

5. The method according to claim 1, wherein the fertilizer melt comprises about 45% w/w calcium nitrate and about 49% w/w potassium nitrate and wherein the temperature of the fertilizer melt is in the range of 200 to 225° C.

* * * * *